(12) United States Patent
Legeai et al.

(10) Patent No.: US 6,991,269 B2
(45) Date of Patent: Jan. 31, 2006

(54) MEANS FOR CONNECTING TWO PIPE ELEMENTS END-TO-END

(75) Inventors: Patrick Legeai, Javene (FR); Olivier Guivar'ch, Le Rheu (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/501,400

(22) PCT Filed: Jan. 14, 2003

(86) PCT No.: PCT/FR03/00096

§ 371 (c)(1),
(2), (4) Date: Jul. 15, 2004

(87) PCT Pub. No.: WO03/062692

PCT Pub. Date: Jul. 31, 2003

(65) Prior Publication Data

US 2005/0040652 A1 Feb. 24, 2005

(30) Foreign Application Priority Data

Jan. 18, 2002 (FR) .................................. 02 00605

(51) Int. Cl.
*F16L 15/00* (2006.01)
*F16L 17/00* (2006.01)
(52) U.S. Cl. .................. 285/392; 285/353; 285/534
(58) Field of Classification Search ................ 285/391, 285/392, 353, 354
See application file for complete search history.

(56) References Cited

U.S. PATENT DOCUMENTS

| 405,745 | A | * | 6/1889 | Ross ......................... 285/384 |
| 448,717 | A | * | 3/1891 | Hogan ....................... 285/385 |
| 944,877 | A | * | 12/1909 | Koschinski ................. 285/388 |
| 1,186,325 | A | * | 6/1916 | Metzger ..................... 285/388 |
| 1,675,808 | A | * | 7/1928 | Kliss ......................... 285/388 |
| 2,761,702 | A | | 9/1956 | Noel |
| 3,113,792 | A | * | 12/1963 | Brown ....................... 285/354 |
| 4,575,044 | A | * | 3/1986 | Gentry ....................... 251/145 |
| 4,676,479 | A | * | 6/1987 | Ogawa et al. ............... 251/151 |
| 4,691,944 | A | | 9/1987 | Viall, Jr. |
| 4,801,158 | A | * | 1/1989 | Gomi ......................... 285/52 |
| 5,401,065 | A | * | 3/1995 | Okumura et al. ........... 285/328 |
| 5,547,229 | A | * | 8/1996 | Eidsmore .................... 285/93 |
| 5,775,743 | A | * | 7/1998 | Rochelle .................... 285/349 |
| 6,354,636 | B2 | * | 3/2002 | Matsuzawa et al. ..... 285/334.5 |

FOREIGN PATENT DOCUMENTS

CH 319 697 2/1957
FR 782 322 6/1935

* cited by examiner

*Primary Examiner*—Vishal Patel
(74) *Attorney, Agent, or Firm*—Young & Thompson

(57) ABSTRACT

Elements for connecting a first end selection (3) of pipe elements to a second end selection (4) of pipe elements, the connecting elements including a sealing joint (20) interposed between the end faces (7, 8) of the first and second end sections and fixing elements (32, 44) which are mounted on the first and second end sections and are coupled to first and second axial abutting elements along the first and second end sections in order to hold the above together and compress the sealing joint between them. The first axial abutting elements include an external shoulder (9) formed on the first section near the end face and the second axial abutting elements include a fixed dowel (50) provided with elements (51) for axial fixing thereof along the second end section.

11 Claims, 3 Drawing Sheets

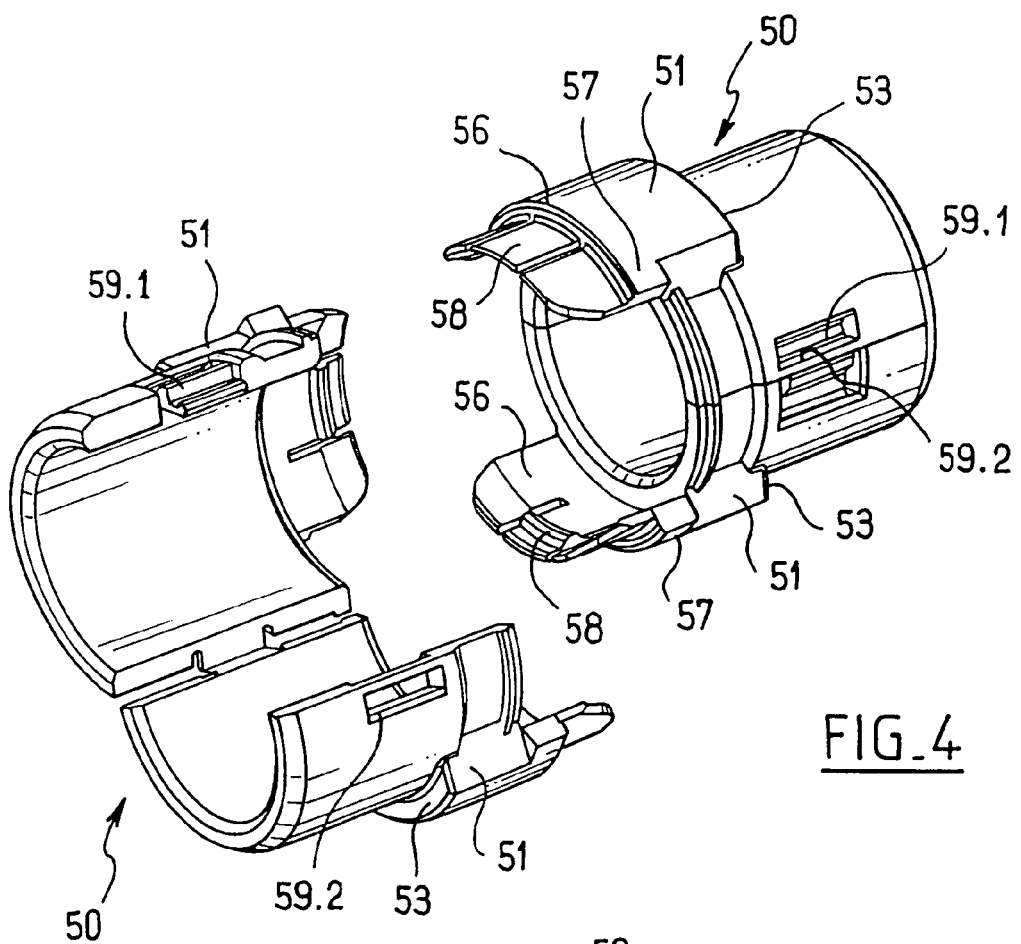
FIG_4
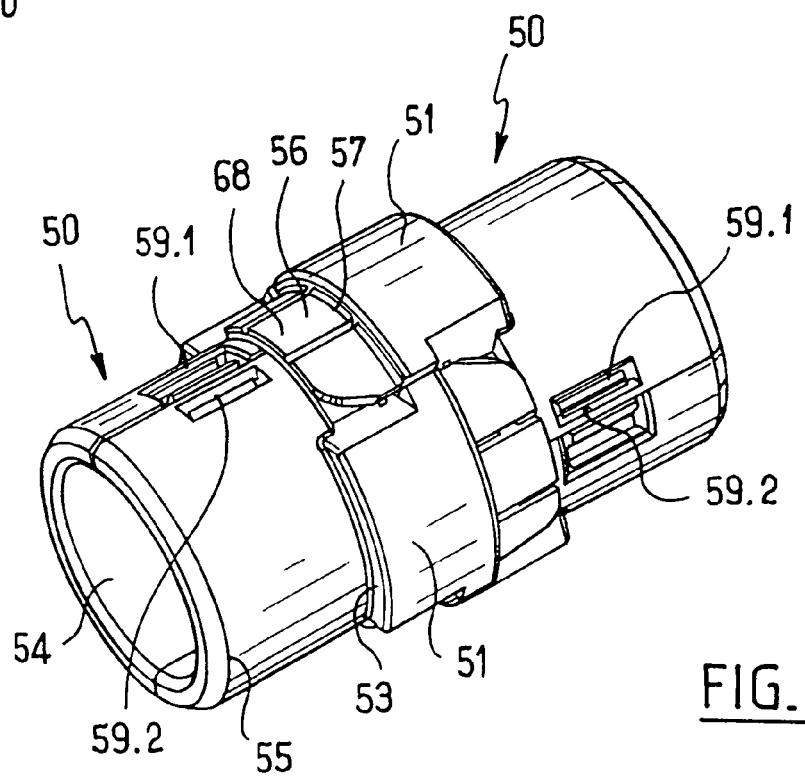
FIG_5

MEANS FOR CONNECTING TWO PIPE ELEMENTS END-TO-END

The present invention relates to means for connecting terminal portions of pipe elements end-to-end.

BACKGROUND OF THE INVENTION

Such connection means are, for example, intended for use in pressurized fluid circuits to connect together two elements of a circuit such as pipes, or to connect a pipe to a functional component that releases or receives fluid.

Devices for coupling two pipes are known; they comprise a union piece formed by a tubular body having two ends. One end of each pipe is intended to be introduced into the union piece. The coupling device also comprises two sleeves each screwed onto one end of the tubular body to deform a clamping washer from a position for allowing the pipe to pass freely to a position for retaining the pipe between an inner shoulder of the sleeve and the end of the tubular body. The pipes are generally positioned in the tubular body by means of annular shoulders arranged in the tubular body to form recessed abutments for the pipes in the union. When two pipes of a circuit are connected together and to other elements of the circuit via such coupling devices, removal of one of the pipes, for example to replace it, necessitates being able to separate the two coupling devices from each other after withdrawing the sleeves in order to remove the ends of the pipes from the tubular bodies of those devices. Dismantling in that manner is difficult to accomplish in a relatively complex circuit where some elements may also be fixed on supports.

In another embodiment, the connection means comprise a sleeve divided into first and second portions in axial succession provided with means for ensuring removable sealed coupling of those portions respectively at the end of the tubular body and the pipe, and a removable abutment ring provided with means for axially blocking it on the pipe set back from the end thereof to constitute a recessed abutment shoulder for fixing the pipe in the tubular body and an axial abutment shoulder between the second portion of the sleeve and the pipe. One or more sleeves is/are disconnected from the corresponding tubular bodies to uncover the abutment rings and access them to release the pipes on which they are installed. Thus, the pipes can be withdrawn laterally.

OBJECTS AND SUMMARY OF THE INVENTION

The invention proposes a novel type of connection means providing a simple alternative to existing means, enabling rapid and effective connection of the elements of the circuit to one another, and allowing ready removal of the elements forming the circuit.

To this end, the invention provides means for connecting together a first terminal portion of a pipe element and a second terminal portion of a pipe element, the connection means comprising both a seal inserted between end faces of the first and second terminal portions, and fixing means mounted on the first and second terminal portions and associated thereat with first and second axial abutment means along the first and second terminal portions to maintain them close together, compressing the seal between them. The first axial abutment means comprise an outer shoulder formed on the first terminal portion close to the end face thereof and the second axial abutment means comprise a removable bush provided with means for axial blocking thereof along the second terminal portion.

In a first embodiment, the first abutment means also comprise a removable bush provided with means for axial blocking thereof along the first terminal portion, and the second abutment means comprise an outer shoulder formed on the second terminal portion close to the end face thereof, the removable bushes being openable to allow them to be engaged laterally on the corresponding terminal portion and being arranged to cooperate with the outer shoulder thereof.

In accordance with a first particular characteristic of this embodiment, the fixing means comprise snap fit tabs having one end integral with one of the bushes and an opposing end which extends beyond the end face of the terminal portion on which the bush is arranged and which is arranged to grip the other bush.

Thus, the connection is produced by laterally engaging the bushes on the terminal portions then bringing them towards the outer shoulders of said terminal portions to snap fit the bushes onto each other so that the bushes, by cooperating with the outer shoulders of the terminal portions, keep the shoulders close together.

In accordance with a second particular characteristic of this embodiment, which may or may not be associated with the preceding characteristic, the outside diameter of the bushes is at least equal to an outside diameter of the outer shoulders of the terminal portions and the fixing means comprise a threaded tubular section and a tapped tubular section each of which is integral with a ring mounted on one of the bushes such that the bushes form axial abutments for the rings, at least one of the threaded and tapped tubular sections extending beyond the end face of the terminal portion on which it is mounted for engagement on the other tubular section when the rings are abutted on the bushes.

The connection is then made by stringing the rings onto the terminal portions and then by engaging the bushes laterally on said terminal portions. The rings are then brought back to the bushes which, by cooperating with the outer shoulders of the terminal portions, ensure axial blocking of the rings with respect to said portions. It is thereby possible to produce a strong coupling that is particularly adapted to high pressures. Further, when the connection means are to be used with pipe elements of different diameters, it is advantageous to provide a set of bushes with different inside diameters which correspond to the different outside diameters of pipe elements and which have identical outside diameters so that it is possible to use the same rings with all of the bushes in a set.

Preferably, in this embodiment, one of the bushes comprises a portion arranged to extend beyond the end face of the corresponding terminal portion when the bush is abutted against the outer shoulder of said terminal portion and to ensure positioning of the seal facing the terminal face.

This holds the seal during assembly by ensuring that it is positioned properly with respect to the terminal portions of the pipe elements, which limits the risk of a leak due to poor assembly of said seal.

In a second embodiment, the removable bush is radially deformable and has an outer surface having a tapered portion, the fixing means being integral with the first and second rings mounted respectively on the first and second terminal portions, the first ring having an inner shoulder for cooperation with the outer shoulder of the first terminal portion and the second ring having an internal tapered surface for cooperation with the tapered portion of the removable bush and constituting a means for clamping the removable bush on the second terminal portion.

Thus, it is possible to couple a pipe having an end with a shoulder to a pipe that does not have an end with a shoulder. The connection means can thus be used with a plurality of types of pipes, in particular pipes which have been cut to length on site.

BRIEF DESCRIPTION OF THE DRAWING

Other characteristics and advantages of the invention become apparent from the following description of particular non limiting embodiments of the invention.

Reference is made to the accompanying drawings, in which:

FIGS. 4 and 5 are perspective views in the disconnected and connected positions respectively of bushes used in a variation of the first embodiment;

DETAILED DESCRIPTION OF THE INVENTION

Figure 1:
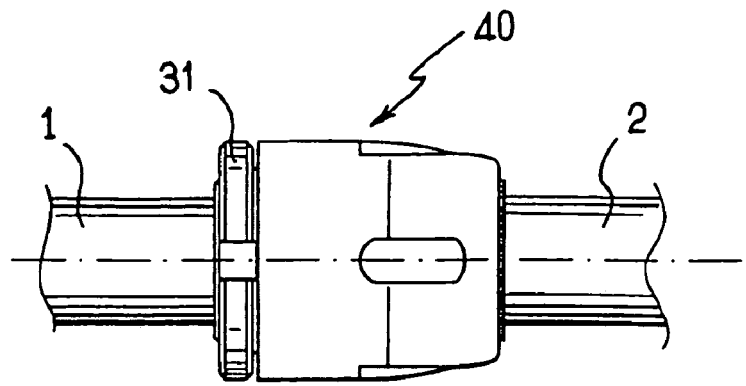
FIG. 1 is an elevation of connection means in accordance with a first embodiment of the invention in the connected position.
Figure 2:
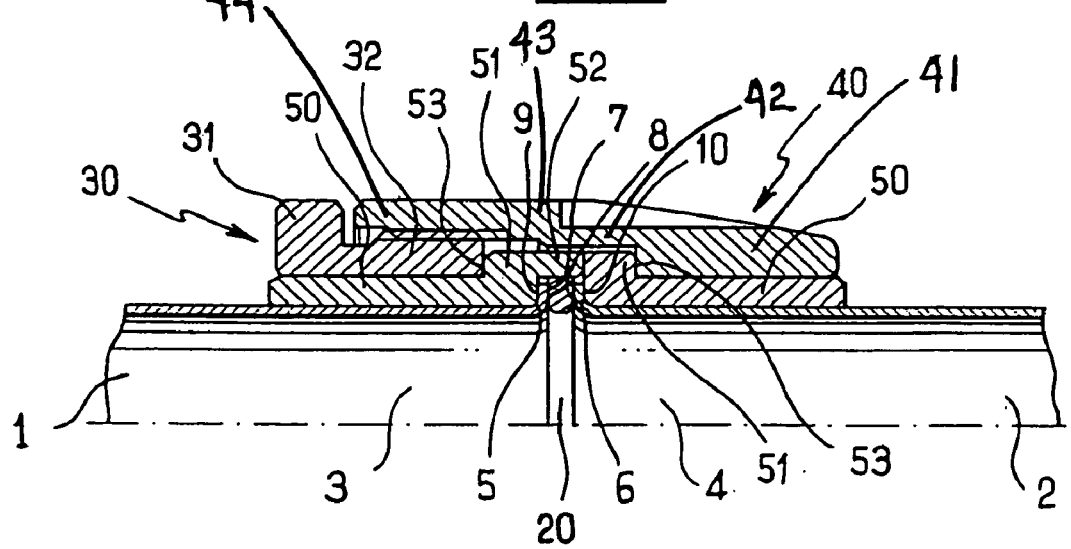
FIG. 2 is a longitudinal cross-sectional half view of said connection means.
Figure 3:
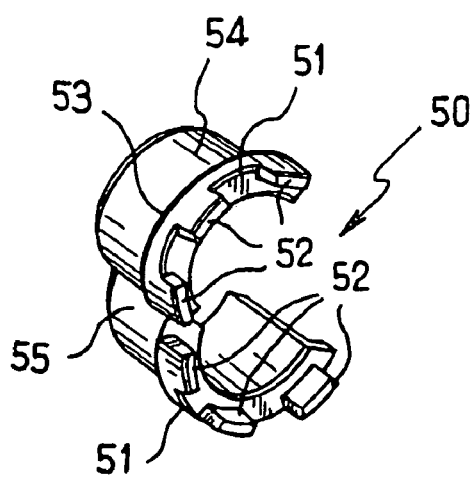
FIG. 3 is a perspective view of a bush used in said connection means.

Referring to FIGS. 1 to 3, connection means in accordance with the first embodiment of the invention are intended to allow end-to-end coupling of two pipes 1, 2 each having a terminal portion 3, 4 provided with a formed flange 5, 6 defining a terminal face 7, 8 of the pipe 1, 2 on one side and a shoulder 9, 10 on the opposing side.

The connection means of the first embodiment comprise both sealing means and also means for fixing the pipes to each other.

The sealing means comprise a seal 20 which in this case is toroidal in shape. The seal is intended to be disposed between the two terminal faces 7, 8 of the pipes 1, 2 to be compressed therebetween. The seal 20 has an inside diameter that is substantially equal to the inside diameter of the pipes 1, 2 and an outside diameter that is slightly greater than the outside diameter of the formed flanges 5, 6. The seal can have other shapes; for example, instead of a circular cross section, it may have a cross-section that is substantially triangular or trapezoidal, in particular when the formed flanges 5, 6 form an angle of less than 90° with the longitudinal axis of the pipe, or it may have a shape that is suitable, when the seal 20 is compressed, for presenting an inner surface interconnecting the inner surfaces of the pipes 1 and 2 without creating a retention zone. The seal 20 may also incorporate an electrically conductive element to ensure electrical conduction between the end faces 7, 8 of the pipes 1, 2. This disposition is important in order to prevent a build-up of electrostatic charge.

The fixing means comprise a ring with a threaded section, generally designated 30, and a ring with a tapped section, generally designated 40, intended for mounting on the terminal portions 3 and 4 respectively via abutment bushes generally designated 50.

The inside diameter of the abutment bushes 50 is substantially equal to the outside diameter of the terminal portions 3, 4 and have an end provided with an outer collar 51. Notches 52 formed by tubular portions extended by axial projections from the collar 51 are disposed thereon about a circle with a diameter that is greater than the outside diameter of the formed flanges 5, 6 and close to the outside diameter of the seal 20. Opposing the notches 52, the collar 51 defines a shoulder face 53. The bushes are openable and here each is constituted by two portions 54, 55 linked together via a deformable hinge to be able to be engaged laterally on the terminal portion 3, 4. The bushes could also be in two portions linked via an elastic ring to be radially expansible to allow the formed flanges 5, 6 to pass through.

The threaded section ring 30 has an inside diameter that is substantially equal to the outside diameter of the bush and less than the outside diameter of the collar 51 so that the collar 51 forms an axial abutment for the ring. The threaded section ring 30 is externally divided in an axial direction into a drive section 31 with outer flats, and a threaded section 32 with a thread root diameter that is greater than the outside diameter of the collar 51 of the bush 50.

The tapped section ring 40 is internally divided in an axial direction into a first recess 41 having a diameter that is substantially equal to the outside diameter of the bush 50 connected via an inner shoulder 42 to a second recess 43 having a diameter that is substantially equal to the outside diameter of the collar 51 of the bush 50 and a tapped section 44 the diameter of which corresponds to that of the screw section 32.

The connection is made by stringing the rings 30, 40 onto the terminal portions 3, 4 then by laterally engaging the open bushes 50 onto the terminal portions 3, 4 and closing the bushes 50 over the terminal portions 3, 4 of the pipes. The collar 51 of the bushes 50 is brought into a bearing position against the shoulder 9, 10 of the formed flanges 5, 6. The notches 52 then extend beyond the end face of the terminal portions.

The seal 20 is then placed between the notches 52 of one of the bushes 50 so that the seal 20 is positioned facing the end face 7, 8 of the corresponding terminal portion 3, 4.

The terminal portions 3, 4 of the pipes 1, 2 are then approached so that the seal 20 is inserted between the end faces 7, 8 of the terminal portions 3, 4 and so that the notches 52 of the bushes 50 are inserted between one another.

The rings 30, 40 are brought over the bushes 50 and brought into abutment with the outer shoulders 53. It should be noted that the length of the recesses 41, 43 is such that the tapped section 44 extends beyond the collar 51 of the bush 50 of the terminal portion 3 so that the threaded section 32 can be screwed into the tapped section 44 until the notches 52 of each bush 50 abut against the collar 51 of the other bush 50. It should also be noted that the length of the notches 52 is such that the seal is moderately compressed. It should be understood that the bushes 50 held closed by the rings 30, 40 axially block the rings 30, 40 with respect to the terminal portions 3, 4 by cooperating with the outer shoulders 9, 10 thereof.

When the other terminal portion of the pipe 1 is connected to another element of the circuit via connection means identical to those described, for each end of the pipe 1 the pipe 1 is withdrawn by unscrewing the rings 30, 40 then removing the bushes 50 and then by displacing the pipe 1 in a parallel direction thereto.

In a variation, as shown in FIGS. 4 and 5, each bush 50 comprises two diametrically opposed elastic tabs 56 which extend axially and have one end 57 that is integral with the collar 51 and an opposing end 58 arranged to grip the other bush 50. Further, portions 54, 55 of each bush 50 are provided opposite the hinge with reciprocal snap fit elements 59.1, 59.2 which can maintain said portions 54, 55 in the closed position.

The bushes 50 engaged on the terminal portions 3, 4 are then brought close together, after interposing a seal between the end faces of the terminal portions 3, 4, by inserting the elastic tabs 56 of each bush 50 between the elastic tabs 56 of the other bush 50. The bushes 50 are then snap fitted with each other. The bushes 50 then alone ensure fixing of the terminal portions 3, 4 one to the other.

For a stronger fixing, rings identical to rings 30, 40 described above can be used in combination with said bushes. Assembly is then identical to that described above.

Identical reference numbers to those described above are used to identify elements that are identical or analogous in the following description of a second embodiment of the invention, made with reference to FIG. 6.

Figure 6:
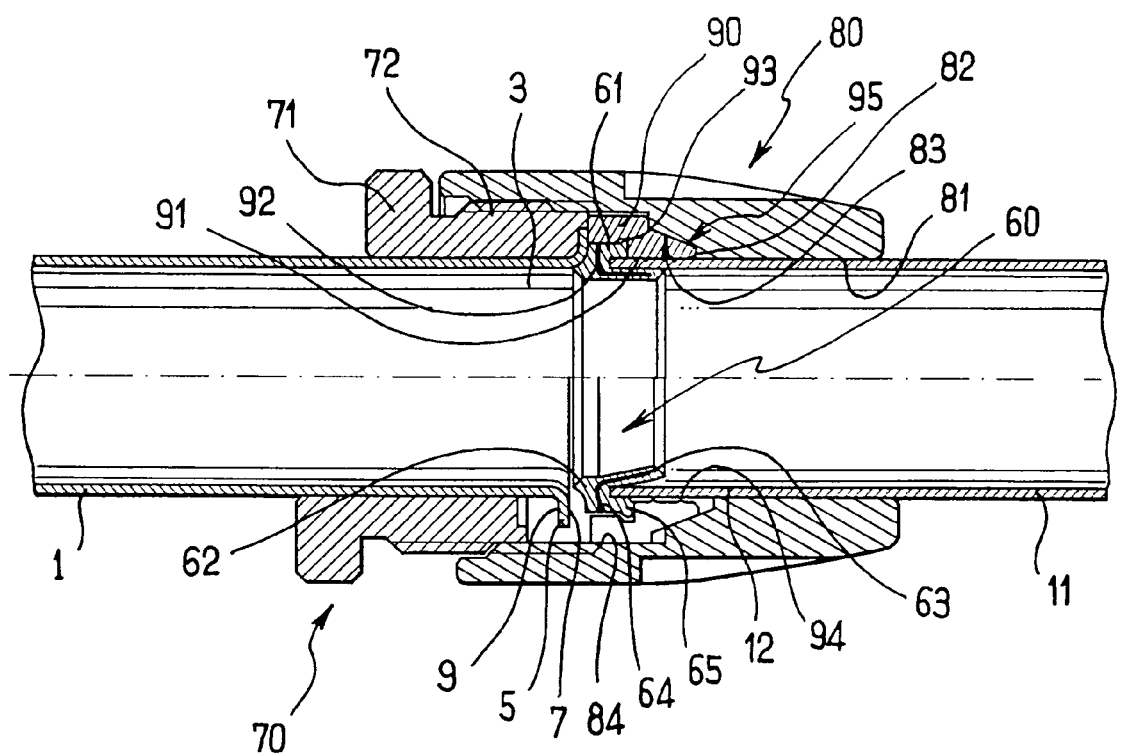
FIG. 6 is a longitudinal cross-section through connection means in accordance with a second embodiment of the invention, the upper half-view representing the connection means in the connected position and the lower half-view representing the connection means in the disconnected position.

Referring to FIG. 6, the connection means of the second embodiment of the invention are intended to allow end-to-end coupling of a pipe 1, identical to that described above, and a pipe 11 having a terminal portion 12 which is free of any type of shoulder and which has an end face 13.

The connection means of the second embodiment comprise both sealing means and also means for fixing the pipes to each other.

The sealing means comprise a seal 60 which comprises an outer tubular section 61 to overlap the terminal portion 12, an adjacent annular section 62 which projects inwardly of the outer tubular section 61 to cover the end face 13 of the terminal portion 12 and an inner tubular section 63 extending from the annular section 62 facing and at a distance from the external tubular section 61. The seal 60 comprises a rigid L-shaped reinforcing insert 64 extending within the annular section 62 and the inner tubular section 63. The seal 60 can also incorporate an electrically conductive element to ensure electrical conduction between the pipes 1, 11 to prevent a buildup of electrostatic charges.

The fixing means comprise a ring with a threaded section generally designated 70 for mounting directly on the terminal portion 3 and a ring with a tapped section generally designated 80 for mounting on the terminal portion 12 via an abutment bush generally designated 90.

The abutment bush 90 is split so that it is radially deformable. The abutment bush 90 is internally divided in an axial direction into a first recess 91 with an inside diameter that is substantially equal to the outside diameter of the terminal portion 12 and a second recess 92 in which the outer tubular section 63 of the seal 60 is lodged. It should be noted that the outer tubular section 63 of the seal 60 comprises an outer annular step 65 received in a corresponding recess 93 in the second recess 92. The bush also comprises clips 94 projecting into the first recess 91 and has an outer surface having a tapered portion 95. The clips 94 are optional.

The threaded section ring 70 has an inside diameter that is substantially equal to the outside diameter of the terminal portion 3 and less than the outside diameter of the formed flange 5 so that the formed flange 5 forms an axial abutment for the threaded section ring 70. The threaded section ring 70 is externally divided in an axial direction into a drive section 71 with outer flats and a threaded section 72 with a thread root diameter that is greater than the outside diameter of the formed flange 5 and the bush 90. The threaded section ring 70 can be openable to engage it laterally on the terminal portion 3 or to be able to mount it on the terminal portion 3 via an abutment bush 50 as described above.

The tapped section ring 80 is internally divided in an axial direction into a first recess 81 with a diameter that is substantially equal to the outside diameter of the terminal portion 12 connected via an inner shoulder 82 to a second recess 83 defined by a tapered surface corresponding to that of the bush 90 and connected to a tapped section 84 the diameter of which corresponds to that of the screw section 72.

The connection is made by engaging the rings 30, 40 on the terminal portions 3, 12. The abutment bush 90 and the seal 60 are then strung onto the terminal portion 12. It should be noted that the tubular sections 61 and 63 diverge slightly to facilitate introducing the terminal portion 12 therebetween.

The terminal portions 3, 12 of the pipes 1, 11 are then brought closer so that the annular portion 62 of the seal 60 is inserted between the end faces 7, 13 of the terminal portions 3, 12.

The threaded section ring is brought against the formed flange 5 and the tapped section ring 80 is brought onto the abutment bush 90. The threaded section 72 is engaged in the tapped section 84. As screw tightening continues, the tapped section ring 80 slides with respect to the bush bearing against the formed flange 5 so that by sliding on the tapered portion 95, the tapered surface of the recess 83 constitutes clamping means for the bush 90 on the terminal portion 12, causing the clips 94 to bite into the outer surface of the terminal portion 12. It should be noted that the length of the portion of the bush 90 projecting from the end face 13 is such that the seal 60 is moderately compressed. The rigid reinforcing insert 65 extending within the annular section 62 and the inner tubular section 63 flattens the inner tubular section 63 against the inner surface of the second terminal portion 12 when the seal 60 is compressed between the terminal portions 1, 12.

Clearly, the invention is not limited to the embodiment described, and variations can be made without departing from the scope of the invention as defined in the claims.

In particular, the invention can be carried out by inverting the embodiments described.

Further, the seal 60 can be annular in shape, in analogy to that of seal 20.

What is claimed is:

1. A device for connecting a first terminal portion of a pipe element and a second terminal portion of a pipe element, comprising:
a seal between an end face of the first terminal portion and an end face of the second terminal portion;
fixing means mounted on the first and second terminal portions and associated thereat with first and second axial abutment means along the first and second terminal portions for holding the first and second terminal portions close together and compressing the seal between end faces of the first and second terminal portions;
wherein the first axial abutment means comprise a first removable bush that is provided with means for axial blocking the first removable bush along the first terminal portion and an outer shoulder on the first terminal portion close to the end face thereof,
wherein the second axial abutment means comprise a second removable bush that is provided with means for axial blocking the second removable bush along the second terminal portion and an outer shoulder on the second terminal portion close to the end face thereof, wherein the first and second removable bushes are openable to allow them to be engaged laterally on the corresponding one of the first and second terminal portions and being arranged to cooperate with the outer shoulder thereof, and wherein the fixing means comprises snap-fit tabs having one end integral with one of the first and second removable bushes and an opposing end that extends axially beyond the end face of the corresponding one of the first and second terminal portions and that is arranged to grip the other of said first and second removable bushes.

2. The device of claim 1, wherein an outside diameter of the first and second removable bushes is at least equal to an outside diameter of the outer shoulders of the first and second terminal portions, and wherein the fixing means further comprise a threaded tubular section and a tapped tubular section that are each integral with a respective ring mounted on one of the first and second removable bushes such that the first and second removable bushes form axial abutments for the rings, at least one of the threaded and tapped tubular sections extending beyond the end face of the one of the first and second terminal portion on which it is mounted for engagement on the other tubular section when the rings are abutted on the first and second removable bushes.

3. The device of claim 1, wherein one of the first and second removable bushes comprises a portion arranged to extend beyond the end face of the corresponding one of the first and second terminal portions when the respective bush is abutted against the outer shoulder of the respective terminal portion and to ensure positioning of the seal facing the end face.

4. The device of claim 1, wherein the outer shoulders of the first and second terminal portions each comprises a surface of a flange.

5. The device of claim 1, wherein the seal comprises means for electrical conduction between the first and second terminal portions.

6. A device for connecting a first terminal portion of a pipe element and a second terminal portion of a pipe element, comprising:

a seal between an end face of the first terminal portion and an end face of the second terminal portion;

fixing means mounted on the first and second terminal portions and associated thereat with first and second axial abutment means along the first and second terminal portions for holding the first and second terminal portions close together and compressing the seal between end faces of the first and second terminal portions;

wherein the first axial abutment means comprise an outer shoulder on the first terminal portion close to the end face thereof, wherein the second axial abutment means comprise a removable bush that is provided with means for axial blocking the removable bush along the second terminal portion, the removable bush being radially deformable and having an outer surface having a tapered portion, and wherein the fixing means is integral with first and second rings mounted respectively on the first and second terminal portions, the first ring having a shoulder cooperating with the outer shoulder of the first terminal portion and the second ring having an internal tapered surface cooperating with the tapered portion of the removable bush, and constituting means for clamping the removable bush on the second terminal portion, the removable bush having a projecting inner surface from which at least one clip extends.

7. The device of claim 6, wherein the outer shoulder comprises a surface of a flange.

8. The device of claim 6, wherein the seal comprises means for electrical conduction between the first and second terminal portions.

9. A device for connecting a first terminal portion of a pipe element and a second terminal portion of a pipe element, comprising:

a seal between an end face of the first terminal portion and an end face of the second terminal portion;

fixing means mounted on the first and second terminal portions and associated thereat with first and second axial abutment means along the first and second terminal portions for holding the first and second terminal portions close together and compressing the seal between end faces of the first and second terminal portions;

wherein the first axial abutment means comprise an outer shoulder on the first terminal portion close to the end face thereof, wherein the second axial abutment means comprise a removable bush that is provided with means for axial blocking the removable bush along the second terminal portion, the removable bush being radially deformable and having an outer surface having a tapered portion, wherein the fixing means is integral with first and second rings mounted respectively on the first and second terminal portions, the first ring having a shoulder cooperating with the outer shoulder of the first terminal portion and the second ring having an internal tapered surface cooperating with the tapered portion of the removable bush, and constituting means for clamping the removable bush on the second terminal portion, and wherein the inner and outer tubular sections diverge when the seal is not compressed, wherein the seal comprises an outer tubular section to overlap the second terminal portion and an adjacent annular section projecting inwardly of the outer tubular section to cover the end face of the second terminal portion, wherein the seal comprises an inner tubular section extending from the adjacent annular section facing the outer tubular section, and wherein the seal comprises a rigid L-shaped reinforcing frame insert extending within the adjacent annular section and the inner tubular section to flatten the inner tubular section against an inner surface of the second terminal portion when the seal is compressed between the first and second terminal portions.

10. The device of claim 9, wherein the outer shoulder comprises a surface of a flange.

11. The device of claim 9, wherein the seal comprises means for electrical conduction between the first and second terminal portions.

* * * * *